Sept. 22, 1925.

J. W. FULPER

SELF SHARPENING SAW

Filed June 10, 1921

1,554,844

INVENTOR
John W. Fulper.

By Jas. P. Richmond
Atty.

Patented Sept. 22, 1925.

1,554,844

UNITED STATES PATENT OFFICE.

JOHN W. FULPER, OF ANNANDALE, NEW JERSEY.

SELF-SHARPENING SAW.

Application filed June 10, 1921. Serial No. 476,400.

*To all whom it may concern:*

Be it known that I, JOHN W. FULPER, a citizen of the United States, residing at Annandale, in the county of Hunterdon and State of New Jersey, have invented certain new and useful Improvements in Self-Sharpening Saws, of which the following is a specification.

This invention relates to self-sharpening and self-renewing saws, wherein through the wearing away of the active set of teeth, there is automatically presented a successive set of similar teeth for effective use.

With commercial saws designed for sawing refractory materials, the teeth rapidly wear away necessitating a re-sharpening. This is not only expensive but entails the loss of the use of the saw while being sharpened.

The present invention provides a saw construction in which rows of similar saw teeth are arranged for successive presentation as active teeth through the wearing away of the teeth of the preceding row, so that as one row of active teeth are worn away, there is, as a result of such wear, a second row of teeth presented, this action continuing until all the rows of saw teeth provided are worn away. As the active life of the ordinary saw in use with refractory materials is comparatively short to the point of necessary re-sharpening, the present invention thus increases the active life of the saw without re-sharpening in substantially direct proportion to the number of rows of teeth provided.

Figure 1:
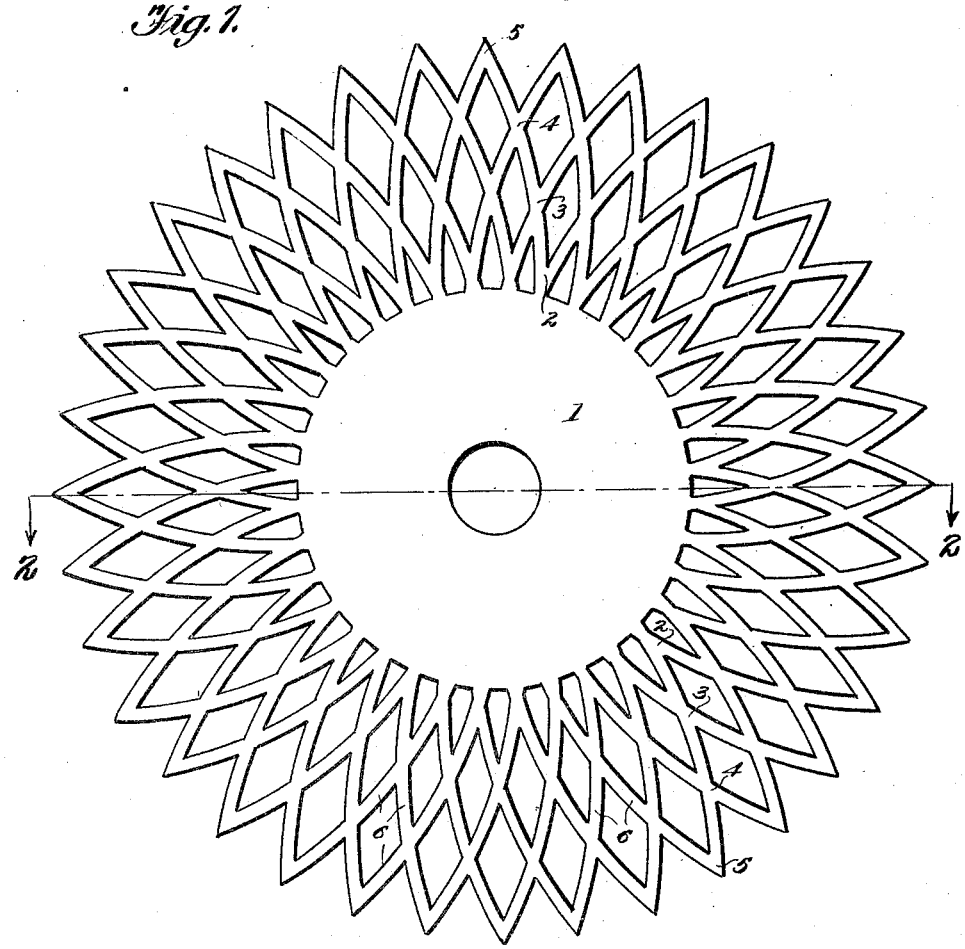
Fig. 1 is a plan view of the improved saw shown as of the circular type.

The saw of this invention, here shown for convenience as of the circular type, comprises a main blade or body 1, which may and preferably is of solid formation, other than through provision as at 7 for mounting the saw. The diameter of the saw proper is materially greater than that of the blade portion 1, the area beyond the blade portion, which will be hereinafter termed the cutting area, being made up of successive rows of saw tooth formations as at 2, 3, 4, and 5. These respective rows of tooth formations, of which the inner row 2 constitutes the normally active teeth are arranged in concentric parallel formations and in relatively alternate disposition, that is, the teeth 3 alternate with the teeth 2, while the teeth 4 alternate with the teeth 3, and so on throughout the series.

Without defining a limitation thereby, a simple and convenient form of the saw herein described may be as shown in Fig. 1 wherein the cutting area is provided by a series of strip-like members 6 of appreciable width and of the desired saw thickness. These members are integral with the blade portion 1 and while their direction is generally radial of the blade, they are curved in their own lengths to afford mutual integral intersection to give the desired successive tooth formations. For example, in the instance shown, each member is on a curvature having the extreme outer edge of the cutting area as a center and a radius equal to the full radius of the saw, so that the member, if continued, would pass through the center of the blade portion 1. With successive centers equalling the spacing of the points of the outermost row of teeth, there will result a series of members 6 intersecting one with another, there being three such intersections in the form shown, with each member finally meeting another member in a terminal point to provide the outermost row of saw teeth.

Figure 2:
Fig. 2 is a section on line 2—2 of Fig. 1.

Of course the saw so formed is of substantially equal thickness throughout, as will be plain from Fig. 2, so that the intersections of the members 6 are in the same plane. The intersections of the respective members provide points arranged in parallel concentric rows throughout the cutting area, and each of these points constitute the point of a cutting tooth.

Obviously the saw is self-sharpening and self-renewing, in that as the teeth 5 for example are worn away in use, there is presented, by this act of wearing of the teeth 5, a second set of substantially similar teeth 4 which are the full equivalent in effective action to the teeth 5. Thus the saw will automatically renew its cutting teeth a number of times corresponding to the number of rows employed, and of course any appropriate or commercially possible number of rows are contemplated.

Through the formation shown, which as stated is the preferred formation, it is entirely possible to cast the saw as well as to form it in any of the other well known ways.

The invention is equally applicable to the ordinary cross cut or band saw, the formation being substantially identical with that shown, such additional forms not being illustrated as they are perfectly obvious adaptations of the generic idea.

This invention is of special utility in operating on sand cores, and for the purpose of dividing such cores it will be evident that the improved disc saw or cutter is mounted for rotation through the medium of its central opening.

Claim:

A saw or cutter of the rotary type for dividing sand cores, comprising a central disk and a self-renewing cutting periphery in the plane of the disk, the cutting portion including a series of strip-like members arranged in pairs throughout the peripheral extent of the disk, each pair having its inner or disk abutting ends spaced apart and converging therefrom to a cutting point, the members of the respective pairs crossing the similar members of other pairs at a series of points intermediate the disk edge and the outer cutting points, each juncture of the members providing an inner cutting point to be available as such as the saw is worn in use.

In testimony whereof I affix my signature.

JOHN W. FULPER.